United States Patent [19]
Darrow

[11] 3,736,434
[45] May 29, 1973

[54] FAIL-SAFE ELECTRONIC COMPARATOR CIRCUIT

[75] Inventor: John O. G. Darrow, Murrysville, Pa.

[73] Assignee: Westinghouse Air Brake Company, Swissvale, Pa.

[22] Filed: June 7, 1971

[21] Appl. No.: 150,550

[52] U.S. Cl. ........................... 307/235 R, 328/149
[51] Int. Cl. ................................................ H03k 5/20
[58] Field of Search ................ 307/235; 328/146.9

[56] References Cited
UNITED STATES PATENTS
3,492,589    1/1970    Rotier ............................. 307/235 X

*Primary Examiner*—John Zazworsky
*Attorney*—H. A. Williamson, A. G. Williamson, Jr. and J. B. Sotak

[57] ABSTRACT

This disclosure relates to a fail-safe comparator circuit having a pair of free-running multivibrators powered by two separate d.c. supply voltages. An a.c. modulating signal is coupled to the multivibrators for alternately pulsing the multivibrators into conduction. An amplifier-detector-filter circuit is coupled to each of the multivibrators for amplifying and demodulating the signals produced by the multivibrators. A rectifier network is coupled to one of the amplifier-detector-filter circuits for producing a d.c. voltage. The d.c. voltage and the demodulated signals of the other amplifier-detector-filter circuit are coupled to a fail-safe "AND" gate so that a periodic output signal is passed by when and only when the two d.c. supply voltages are in agreement and no critical component or circuit failure is present.

17 Claims, 1 Drawing Figure

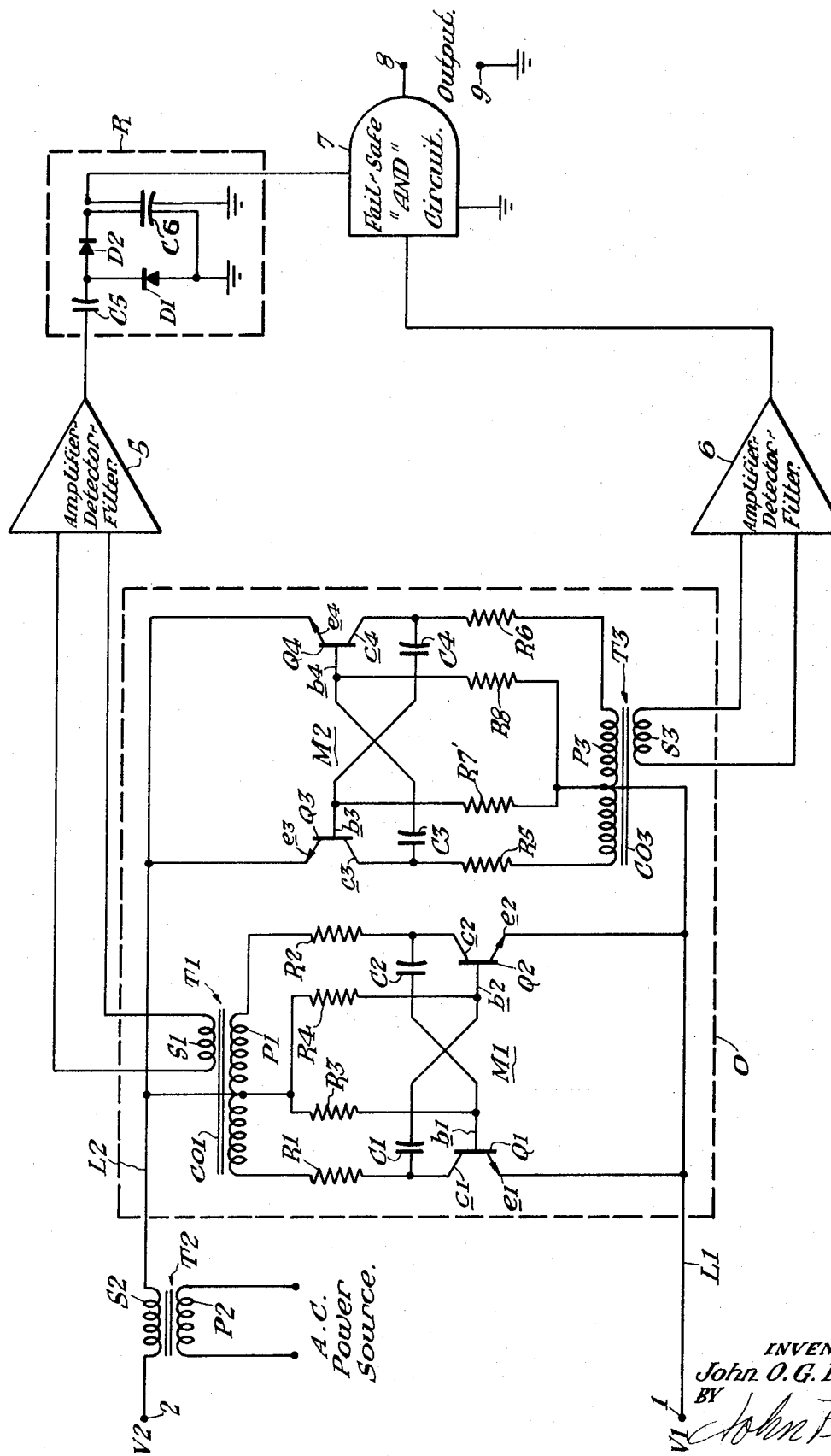

FAIL-SAFE ELECTRONIC COMPARATOR CIRCUIT

My invention relates to a fail-safe circuit arrangement and more particularly to an electronic comparator circuit for measuring the amplitudes of two d.c. input signals and for producing a periodic output signal when and only when the amplitudes of the two d.c. input signals are in agreement and no critical circuit or component failure is present.

Vacuum tube and transistor circuits for comparing the amplitudes of two input signals and producing an output signal when the amplitudes are substantially equal, are old and well known in the art. Normally, these previous comparator circuits are generally acceptable for use in ordinary nonvital applications but are wholly unsatisfactory for employment in special vital operations. For example, in signal and communication systems for railway or mass and/or rapid transit operations, it is mandatory that each portion or circuit of the apparatus operates in a fail-safe manner. Such a stringent operating requirement is essential in order to prevent costly damage to the equipment as well as to preclude serious injury and possible death to employees and passengers. It will be appreciated that a high speed train or mass transit vehicle is an imminently dangerous object if the control system fails in an unsafe manner. Therefore, a less restrictive speed command should never be capable of being simulated by a circuit or component failure. In order to ensure such operation, it is necessary to carefully analyze and examine each and every circuit component for all its shortcomings as well as to optimize the design and layout of the circuit. Thus, it will be appreciated that a comparator circuit which is capable of producing an erroneous output when its inputs are out of agreement is not suitable for use in vital types of control systems.

Accordingly, it is an object of my invention to provide a new and improved comparator circuit which operates in a fail-safe manner.

Another object of my invention is to provide a fail-safe comparator circuit which produces an output signal only when its input signals are in agreement.

A further object of my invention is to provide a vital type of comparator circuit which is incapable of producing an output signal during a critical circuit or component failure or when its input signals are not in agreement.

Still another object of my invention is to provide a novel fail-safe electronic comparator circuit for comparing the amplitudes of a pair of d.c. voltages and producing a periodic output signal when and only when the amplitudes of the d.c. voltages are in agreement.

Still a further object of my invention is to provide an improved fail-safe transistorized comparator circuit employing an oscillator which is composed of a pair of multivibrators alternately oscillating at a preselected resonant frequency only when the amplitudes of a pair of inputs are in agreement and no critical circuit or component failure is present.

Yet a further object of my invention is to provide a unique fail-safe electronic comparator circuit having a pair of free-running multivibrators which are alternately pulsed "on" and "off" by an a.c. signal source so that oscillations are applied to a pair of amplifier-detector-filters which cause an "AND" gate to be turned "on" to pass a periodic output signal when and only when the amplitudes of a pair of d.c. input signals powering the multivibrators are substantially equal.

Still yet another object of my invention is to provide a fail-safe comparator circuit which is economical in cost, simple in design, reliable in operation, durable in use, and efficient in service.

In accordance with the present invention, the unique electronic comparator circuit compares the amplitudes of a pair of d.c. input voltages. The comparator circuit includes a first and a second free-running multivibrator, each of which is powered by the d.c. input voltages. Each multivibrator includes a pair of NPN transistors each of which is connected in a common-emitter configuration. The multivibrators are oppositely poled and are alternately rendered conductive and nonconductive by an a.c. modulating signal which is transformer coupled between one of the pair of d.c. input voltages and the multivibrators. The modulated oscillations from the multivibrators are transformer coupled to a pair of amplifier-detector-filter circuits each of which demodulates the oscillations. The demodulated oscillations from one of the pair of amplifier-detector-filter circuit is rectified by a voltage doubling network. The rectified voltage and the demodulated oscillations from the other of the pair of amplifier-detector-filter circuits are applied to a fail-safe "AND" gate. Thus, a reproduced and amplified periodic output signal is passed by the "AND" gate when and only when the pair of d.c. input voltages are in agreement and no critical circuit or component failure is present.

The foregoing objects and other attendant features and advantages will be more readily appreciated as the subject invention becomes better understood by reference to the following detailed description when considered in conjunction with the accompanying drawing wherein:

The single FIGURE is a schematic circuit diagram of a fail-safe electronic comparator circuit embodying the principles of the present invention.

Referring to the single FIGURE of the drawing, there is shown a preferred embodiment of a fail-safe solid state comparator circuit of the present invention. The fail-safe comparator is composed of a relaxation type of oscillator O which includes a pair of multivibrators M1, M2. Each of the multivibrators is an astable or free-running type of oscillator including a pair of regenerative amplifying stages. As shown, the first multivibrator M1 includes a pair of NPN transistors Q1 and Q2, each having an emitter, a collector, and a base electrode. The two transistor stages of the multivibrator M1 are connected into a common-emitter configuration. As shown, the emitter electrodes $e1$ and $e2$ of transistors Q1 and Q2, respectively, are directly connected via lead L1 to a first input terminal 1. Cross coupling is provided between the collector and base electrodes of each transistor by a pair of timing capacitors. For example, capacitor C1 couples the collector electrode $c1$ of transistor Q1 to the base electrode $b2$ of the transistor Q2 while capacitor C2 couples collector electrode $c2$ of the transistor Q2 to the base electrode $b1$ of the transistor Q1. The collector electrode $c1$ of transistor Q1 is also connected to one end of a center-tapped primary winding P1 of transformer T1 via resistor R1. The collector electrode $c2$ of transistor Q2 is connected to the other end of the center-tapped primary winding P1 via resistor R2. The base electrode $b1$ of transistor Q1 and the base electrode $b2$ of transistor Q2 are connected via resistors R3 and R4, respectively, to the center tap of the primary winding P1. The center tap of primary winding P1 is also connected to lead L2 which in turn is connected to terminal 2 via the secondary winding S2 of transformer T2, the purpose of which will be described hereinafter.

The second free-running multivibrator M2 also includes a pair of NPN transistors Q3 and Q4. As shown, the emitter electrodes e3 and e4 of transistors Q3 and Q4, respectively, are directly connected to lead L2. The collector electrode c3 of transistor Q3 is connected to one end of a center-tapped primary winding P3 of transformer T3 via resistor R5. The collector electrode c4 is connected to the other end of the center-tapped primary winding P3 via resistor R6. The base electrodes b3 and b4 are connected by resistors R7 and R8, respectively, to the center tap of the primary winding P3 which, in turn, is directly connected to lead L1. A timing capacitor C3 couples the collector electrode c3 of transistor Q3 to the base electrode b4 of the transistor Q4 while a timing capacitor C4 couples collector electrode c4 of the transistor Q4 to the base electrode b3 of the transistor Q3.

As shown, the transformer T1 includes a secondary winding S1 which is wound upon magnetic core CO1 and is thus inductively coupled to the primary winding P1. Similarly, the transformer T3 includes a secondary winding S2 which is wound upon magnetic core CO3 and is thus inductively coupled to the primary winding P3. The secondary winding S1 is connected to an amplifier-detector-filter circuit 5 while the secondary winding S3 is connected to an amplifier-detector-filter circuit 6. Both of the amplifier-detector-filter circuits 5 and 6 may be identical networks which employ readily available commercial components. The amplifier stages include active elements, such as, transistors, which provide suitable gain and which are preferably relatively insensitive to temperature and impedance variations. In the present case, each of the amplifiers feeds a conventional diode detector which recovers the modulating signals, as will be described hereinafter. Each of the detectors is connected to a suitable filtering circuit which removes all but the modulating signal. Each of the filters may simply consist of a four-terminal capacitor which ensures that the loss of a lead will not result in a high ripple output.

As shown, the output from the amplifying-detecting-filtering circuit 5 is connected to a fail-safe half-wave voltage doubler or voltage rectifier R while the output from the amplifying-detecting-filtering circuit 6 is directly connected to one input of a fail-safe "AND" circuit 7, as will be described presently. The voltage rectifier R includes a pair of charging capacitors C5 and C6 as well as a pair of diode rectifiers D1 and D2. The series charging capacitor C5 has one end connected to the output of circuit 5 and has the other end connected to the junction point which is common to the cathode of diode D1 and to the anode of diode D2. The anode of diode D1 and one terminal of the lower plate of the four-terminal doubler charging capacitor C6 are connected to ground. The cathode of diode D2 is connected to the one terminal of the upper plate of the doubler charging capacitor C6. The other terminal of the lower plate of capacitor C6 is connected to a separate ground while the other terminal of the upper plate of capacitor C6 forms the output of the voltage rectifier R. The use of a four-terminal capacitor is preferred in that the loss of any single lead will not impair the operation of the rectifier and will ensure that unsafe failure will not occur. It should be noted that the polarity of rectifier R is selected to be opposite to that of the power supply for amplifier-detector-filter 5, so no failure can simulate a valid output. The output from the voltage rectifier is connected to the other input of the fail-safe "AND" circuit 7.

The fail-safe "AND" circuit 7 is preferably of the type shown and disclosed in Letters Pat. of the U.S. No. 3,430,066, to Marsh et al., assigned to the assignee of the present invention. As disclosed, the fail-safe "AND" logic gate 7 includes an a.c. amplifier having a predetermined gain factor. The d.c. input to the amplifier is applied through a biasing network which biases the amplifier for linear or class A operation. The a.c. input to the amplifier is fed through an attenuating network which reduces the a.c. input by an amount equal to the amplifier gain factor so that the circuit operates as a unity gain device. Accordingly, a periodic output is available across output terminals 8 and 9 when and only when both inputs are present and no malfunction is present.

Turning now to the operation of the present invention it will be assumed that the circuit is intact, that the input voltages +V1 and +V2 are substantially equal, and that the low frequency a.c. input voltage is applied to the primary winding P2, so that a periodic output voltage will appear across terminals 8 and 9. Initially, when the voltages V1 and V2 are applied to the terminals 1 and 2, collector currents begin to flow in both transistors of both multivibrators. The initial currents that flow are approximately equal to each other; however, a perfect circuit balance is practically impossible and any small circuit dissimilarity will cause the collector current in one transistor to be slightly larger than the collector current in the other transistor of the multivibrator. This slightly greater amount of collector current in one transistor will tend to start operation of the multivibrator.

However, in addition to the two (2) d.c. voltages, the a.c. input voltage is also impressed upon the comparator circuit which will effect operation of the multivibrators. It can be seen that when the voltages V1 and V2 are in agreement, the absolute value of voltage between leads L1 and L2 is a function of the peak-to-peak voltage of the a.c. input signals induced in the secondary winding S2 of transformer T2. That is, the voltage differential between leads L1 and L2 is dependent upon the instantaneous voltage level of the a.c. input signals. If we first assume that a positive alternation is developed in the secondary winding S2, then lead L2 is more positive than lead L1. This allows multivibrator M1 to be turned on but ensures that multivibrator M2 cannot be turned on since the base-emitter electrodes of transistors Q3 and Q4 are reverse biased. Assuming that the initial collector current of transistor Q1 is slightly greater than the collector current of transistor Q2, the voltage drop across resistor R1 will cause the voltage at the collector of transistor Q1 to decrease. The decrease in voltage is applied by capacitor C1 to the base b2 of transistor Q2 to drive the transistor to cutoff. Simultaneously, the cutting off of transistor Q2 causes its collector to appear at the voltage potential level of lead L2 which, in turn, is applied to the base electrode b1 through capacitor C2, thereby rendering transistor Q1 fully conductive. That is, the current through transistor Q1 increases steadily as the current through the transistor Q2 decreases steadily until transistor Q2 is cut off. The collector current and collector voltage of the transistor Q1 remain constant until the capacitor C1 begins to discharge. As the capacitor C1 continues to discharge, the reverse biasing on the base electrode $b2$ of transistor Q2 decreases. As the discharging action continues a point is reached at which the base-emitter electrodes of transistor Q2 are again forward biased. The conduction of transistor Q2 causes collector current through the collector electrode $c2$ of transistor Q2 to increase and causes the voltage at the collector electrode $c2$ to decrease. This decrease in voltage is fed back through capacitor C2 to the base electrode $b1$ of transistor Q1, thereby reverse-biasing the transistor Q1. This action continues until transistor Q2 is conducting heavily and transistor Q1 is fully cut off.

It will be appreciated that the normal period of oscillation of the multivibrator M1, namely, the resonant frequency of oscillation is determined by the RC time constants of the circuit parameters. Preferably, the frequency of oscillation is chosen to be relatively high in comparison to the frequency of the a.c. input signals applied to the transformer T2 so that the oscillating signals of the multivibrator are in effect carrier waves while the low frequency a.c. input voltage is in effect a modulating signal. Thus, a modulated carrier signal will be induced into the secondary winding S1 when a positive alternation of the low frequency a.c. input signal is induced into secondary winding S2. The modulated carrier wave is in turn amplified and demodulated by the amplifier and detector stages of circuit 5 and applied to the input of rectifier R. Unwanted and spurious frequency signals, such as noise, carrier ripple, and the like, are removed by the four-terminal filtering capacitor of circuit 5. The demodulated signals are rectified and doubled by the voltage rectifier R. A sufficient amount of capacitance is built into the voltage rectifying network R to ensure that a substantially constant d.c. voltage will subsequently be available when the multivibrator M1 is pulsed "off" as will be described hereinafter.

Let us now analyze what occurs when the negative excursion of the low frequency a.c. modulating signal is induced into the secondary winding S2. Assuming that voltages V1 and V2 are still equal, it will be seen that the negative alternation causes the absolute voltage level between leads L1 and L2 to reverse. That is, lead L1 will become more positive than lead L2 so that the conductive conditions of the multivibrators M1 and M2 will be reversed. The base-emitter electrodes of transistors Q3 and Q4 will become forward biased so that multivibrator M2 will be pulsed "on" while the base-emitter electrodes of transistors Q1 and Q2 will become reverse biased so that multivibrator M1 will be pulsed "off." The operation of multivibrator M2 is substantially identical to that of multivibrator M1, and, therefore, no further detailed discussion is presented at this point.

The pulsing "off" of multivibrator M1 causes removal of the modulation in secondary winding S1, but the pulsing "on" of the multivibrator M2 causes a modulated signal to be induced into secondary winding S3. The modulated signal is amplified and demodulated by circuit 6, and, in turn, applied to the second input of the fail-safe "AND" circuit 7. Even though the multivibrator M1 is pulsed "off" during the negative alternation the stored energy in capacitor C6 causes a d.c. input voltage to be maintained on fail-safe "AND" gate 7 and an a.c. input is furnished to the fail-safe "AND" gate 7 from the amplifier-detector-filter circuit 6. Under this condition, the gate 7 is in its signal passing mode of operation and a periodic output signal will appear on terminals 8 and 9, thereby signifying agreement between voltages V1 and V2. The low frequency a.c. modulating signal will continue to cause the two multivibrators to be alternately pulsed "on" and "off." Thus a periodic output voltage will appear across terminals 8 and 9 so long as the input voltages V1 and V2 remain substantially equal or in agreement.

If, for some reason, either the voltage V1 or the voltage V2 varies relative to each other, the periodic output signals on terminals 8 and 9 will disappear due to the absence of modulated carrier waves being induced into secondary winding S1 or S3. That is, if the voltage difference between voltages V1 and V2 exceeds the peak value of the low frequency a.c. voltage induced into secondary winding S2, one of the multivibrators will run continuously, while the other multivibrator will remain quiescent. For example, when voltage V2 becomes substantially greater than voltage V1, multivibrator M1 will oscillate continuously, while multivibrator M2 will remain cut "off." Conversely, when voltage V1 becomes substantially greater than V2, multivibrator M2 will oscillate continuously, while multivibrator M1 will remain cut "off." In each of the cases, one multivibrator will remain "on" while the other multivibrator will remain "off" due to the lack of polarity reversal between leads L1 and L2. In the first case, lead L2 will always be positive with respect to lead L1, and in the second case, lead L1 will always be positive with respect to lead L2. When multivibrator M2 remains "off," no modulated signals are induced into secondary winding S3 so that no a.c. input is applied to the "AND" gate 7. Thus, no periodic output signal is available at terminals 8 and 9. Conversely, when multivibrator M1 remains "off," no modulated signals are induced into the secondary winding S1 so that no d.c. biasing voltage is available at the "AND" gate 7. The lack of d.c. voltage causes the gate to assume a signal blocking mode of operation so that no periodic output signal can be developed on terminals 8 and 9. Thus, the lack of a periodic output signal on terminals 8 and 9 may be employed to indicate that the voltages V1 and V2 are out of agreement. Conversely, it will be appreciated that a periodic output signal appearing across terminals 8 and 9 indicates that the d.c. supply voltages V1 and V2 are in agreement and that a critical circuit or component failure is not present.

As previously mentioned, no critical circuit or component failure is capable of producing a periodic output signal across terminals 8 and 9. For example, the failure of an active element, such as transistors Q1, Q2, Q3, or Q4, destroys the amplifying qualities of the multivibrators so that oscillations will not occur. The opening of a load resistor or biasing resistor or of the coupling capacitors destroys the circuit integrity of the multivibrator so that oscillations will not occur. Similarly, the opening of any of the primary or secondary windings destroys the transforming abilities of transformers T1 and T3 so that no periodic output signals will be produced across terminals 8 and 9. The shorting of turns between the windings reduces the amplitude of the output signal and thus is a safe failure. The shorting of either coupling capacitor destroys the timing characteristics of the multivibrator and thus prevents periodic output signals from being developed across terminals 8 and 9. The resistors are selected of a special composition so that no short circuit can develop in these elements. Similarly, failure of any active element in circuits 5 and 6 either destroys their amplifying characteristics or causes interruption of the circuit integrity.

The rectifier R and the "AND" gate are fail-safe devices in themselves, and are thus incapable of failing in an unsafe manner. The opening of either the primary or secondary winding of the transformer T2 removes the required a.c. modulating voltage from the comparator circuit which destroys the ability of the circuit to produce a periodic output signal on terminals 8 and 9. Obviously, the shorting of turns between the secondary winding of transformer T2 increases the sensitivity of the comparator circuit and thus is a safe failure. The safety factor of the transformer T2 may also be increased to ensure that there would be little, if any, possibility that the shorting of turns will occur in the primary winding P2.

Accordingly, it can be seen that this unique comparator circuit produces an output across terminals 8 and 9 when and only when the d.c. potentials V1 and V2 are in agreement and no critical circuit or component failure is present.

It will be appreciated that various alterations may be made by persons skilled in the art without departing from the spirit and scope of this invention.

For example, it is readily understood that the complements of the transistor shown in the drawing may be of the opposite polarity by simply reversing the polarity of the biasing voltages, and that other amplifier configurations may also be used, as is well known. Further, it is understood that if complementary types of transistors are employed for each pair of transistors, the multivibrators need not be poled in opposite directions. In addition, the primary windings of the transformers T2 and T3 need not be of the center-tapped type but may be a single winding connected to the output circuit of either amplifying stage of the multivibrators. Further, where isolation is not required, transformers T2 and T3 may be omitted and the modulated signals may be taken from across the collector load resistors. In addition, it is understood that the frequency of the modulating signal and that of the carriers may be selected to the desired needs of the particular application for which the comparator is employed. It will also be apparent that other modifications and changes may be made to the presently described invention and therefore it is understood that all changes, equivalents, and modifications falling within the spirit and scope of the present invention are herein meant to be included in the appended claims.

Having thus described my invention, what I claim is:

1. A fail-safe electronic comparator circuit comprising, first and second supply terminals, an oscillator means coupled to said first and second supply terminals, a periodic signal source intercoupled between one of said first and second supply terminals and said oscillator means for controlling the conductive condition of said oscillator means, an amplifying, detecting and filtering means coupled to said oscillator means, and a gating means coupled to said amplifying, detecting and filtering means for producing a periodic output signal when and only when the amplitude of the supply voltage on said first and second supply terminals is substantially equal and no critical component or circuit failure is present.

2. A fail-safe electronic comparator circuit as defined in claim 1, wherein said oscillator means includes a first and a second multivibrator.

3. A fail-safe electronic comparator circuit as defined in claim 1, wherein said periodic signal source is an a.c. modulating source having a frequency substantially lower than the natural frequency of said oscillator means.

4. A fail-safe electronic comparator circuit as defined in claim 3, said a.c. modulating source is transformer coupled between said first supply terminal and said oscillator means.

5. A fail-safe electronic comparator circuit as defined in claim 2, wherein said first and said second multivibrator are oppositely poled across said first and said second supply terminals.

6. A fail-safe electronic comparator circuit as defined in claim 2, wherein said amplifying, detecting and filtering means includes a first amplifier-detector-filter coupled to said first multivibrator and a second amplifier-detector-filter coupled to said second multivibrator.

7. A fail-safe electronic comparator circuit as defined in claim 6, wherein a first transformer couples said first amplifier-detector-filter to said first multivibrator and a second transformer couples said second amplifier-detector-filter to said second multivibrator.

8. A fail-safe electronic comparator circuit as defined in claim 2, wherein said first and second multivibrators each include a pair of NPN transistors.

9. A fail-safe electronic comparator circuit as defined in claim 8, wherein the emitter electrodes of one pair of NPN transistors are coupled to said first supply terminal and the emitter electrodes of the other pair of transistors are coupled to said second supply terminal.

10. A fail-safe electronic comparator circuit as defined in claim 1, wherein a fail-safe "AND" gate having a pair of inputs is coupled to said amplifying, detecting and filtering means.

11. A fail-safe electronic comparator circuit as defined in claim 10, wherein one of said pairs of inputs of said fail-safe "AND" gate is fed by said first amplifying, detecting and filtering means and the other of said pair of inputs of said fail-safe "AND" gate is fed by said second amplifying, detecting and filtering means.

12. A fail-safe electronic comparator circuit as defined in claim 11, wherein a rectifier network is intercoupled between said first amplifying, detecting and filtering means and said one of said pair of inputs of said fail-safe "AND" gate.

13. A fail-safe electronic comparator circuit as defined in claim 12, wherein said rectifier network is in the form of a pair of diodes and a pair of capacitors.

14. A fail-safe circuit arrangement for comparing the amplitudes of a pair of d.c. voltages comprising, a pair of input means, a pair of multivibrators connected across said pair of input means, said pair of multivibrators connected to one of said pair of input means through the secondary winding of a transformer, an a.c. modulating signal applied to the primary winding of said transformer, a first amplifier-detector-filter circuit connected to one of said pair of multivibrators, a second amplifier-detector-filter circuit connected to the other of said pair of multivibrators, and an "AND" gate circuit connected to said first and said second amplifier-detector-filter circuits for producing a periodic output signal when and only when the pair of d.c. voltages are in agreement and said multivibrators are alternately pulsed "on" and "off" by said a.c. modulating signal.

15. A fail-safe circuit arrangement as defined in claim 14, wherein said first amplifier-detector-filter is transformer coupled to said one of said pair of multivibrators and said second amplifier-detector-filter is transformer coupled to said other of said pair of multivibrators.

16. A fail-safe circuit arrangement as defined in claim 14, wherein said multivibrators are oppositely poled across said pair of input means.

17. A fail-safe circuit arrangement as defined in claim 14, wherein the input to said "AND" gate circuit from said first amplifier-detector-filter circuit is rectified so that d.c. voltage is applied to said "AND" gate circuit.

* * * * *